Nov. 16, 1937.　　A. O. CARPENTER　　2,099,556
SAFETY DEVICE FOR ENGINES
Filed Sept. 23, 1936　　2 Sheets-Sheet 1

INVENTOR
Allan O. Carpenter
BY
HIS ATTORNEY.

Patented Nov. 16, 1937

2,099,556

UNITED STATES PATENT OFFICE 2,099,556

SAFETY DEVICE FOR ENGINES

Allan O. Carpenter, Corning, N. Y., assignor to Ingersoll-Rand Company, Jersey City, N. J., a corporation of New Jersey Application September 23, 1936, Serial No. 102,079

4 Claims. (Cl. 137—140)

This invention relates to engines, and more particularly to a safety device associated with the pressure lubricating system of an engine.

One object of the invention is to automatically stop the engine when it is operating under conditions considered unsafe as, for example, when the pressure in the lubricating system drops to a value that would be too low to effectively lubricate the engine.

Another object is to induce a decreasing pressure in the lubricating system and thereby cause operation of the safety device whenever the speed of the engine exceeds a certain predetermined maximum.

Other objects will be in part obvious and in part pointed out hereinafter.

Figure 1:
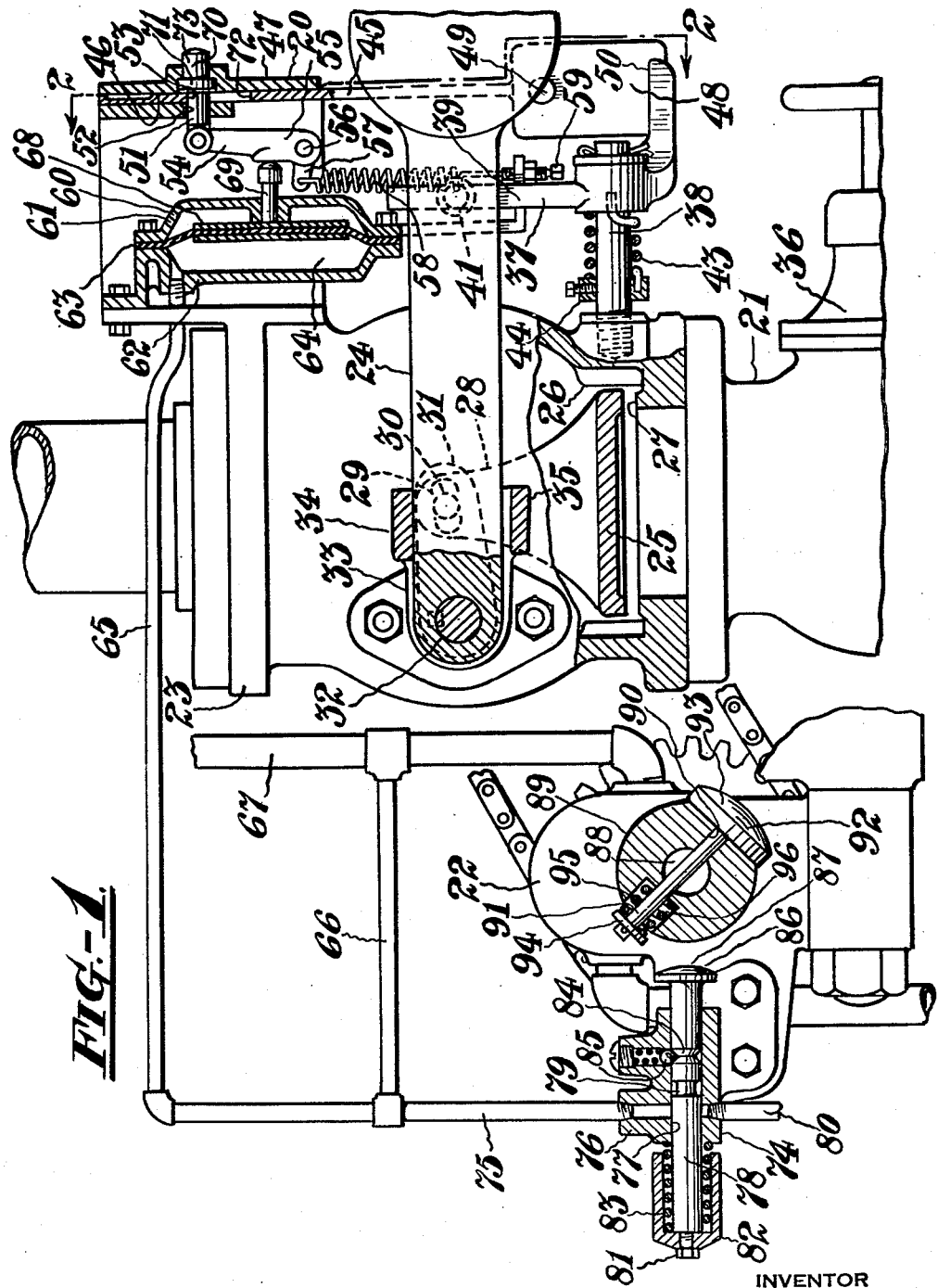
Figure 2:
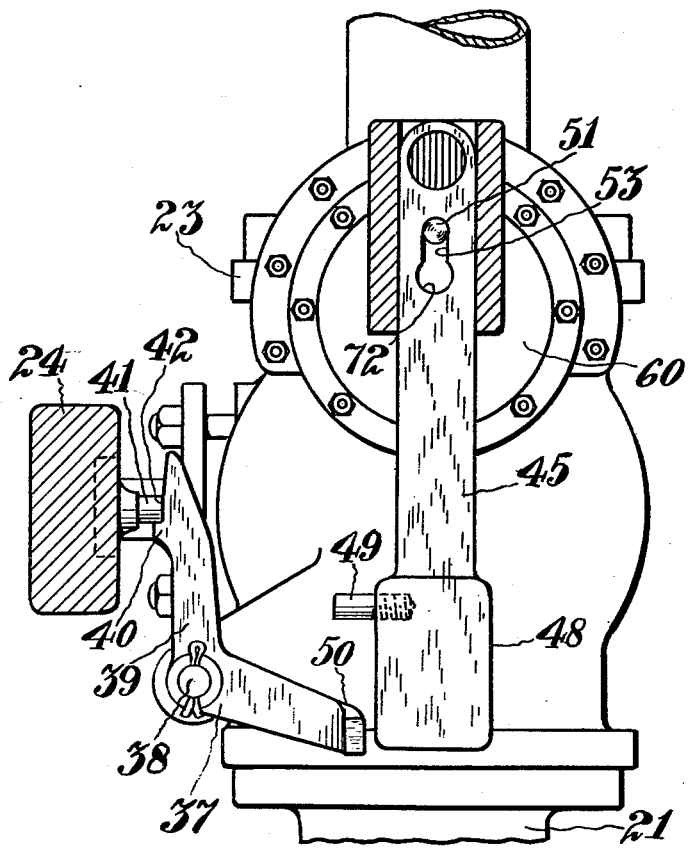

In the drawings accompanying this specification and in which similar reference numerals refer to similar parts, Figure 1 is a side elevation, partly in section, of a safety device constructed in accordance with the practice of the invention, and Figure 2 is a transverse view taken through Figure 1 on the line 2—2.

Referring more particularly to the drawings, 20 designates, in general, a safety device constructed in accordance with the practice of the invention, 21 a conduit for conveying power medium to an engine to which the safety device may be applied, and 22 designates a pump for pumping lubricant under pressure to the various bearing surfaces of the engine, and which may be connected to be driven by the crank shaft of the engine.

The safety device is mounted, in the present instance, on the casing 23 of a safety valve interposed in the conduit 21 and comprises as an element a weighted lever 24 for actuating a valve 25 in the casing 23. The valve 25 is loosely guided by ribs 26 in the casing 23 and cooperates with a seat 27 to cut off the flow of steam through the conduit 21. On the upper surface of the valve 25 is a wing 28 having an oblong slot 29 to accommodate a pin 30 carried by an arm 31 keyed to a rotary shaft 32 in the casing 23. The weighted lever 24 is also mounted on the shaft 32 but is freely rotatable thereon. Adjacent the lever and mounted on the shaft 32, to which it is keyed, is a plate 33 having lateral projections 34 and 35 respectively overlying and extending underneath the lever 24 and so spaced that the lever is capable of some degree of movement between the projections.

During the normal operation of the engine the valve 25 is, of course, in the open position and plays no part in the control of the flow of steam through the conduit, this being effected by other devices, as for example a hand-controlled valve 36. The valve 25 serves more particularly the function of a safety valve adapted to cut off the flow of steam to the engine in the event that the pressure of the lubricant in the lubricating system of the engine drops to a value insufficient to maintain the various bearing surfaces of the engine in a safely lubricated condition.

The valve 25 is accordingly held open by the lever 24 which in this position of the parts bears against the projection 34, and the lever is in turn supported by a latch 37 mounted pivotally upon a rod 38 threaded into the casing 23. The latch 37 is in the form of a bell crank of which an upwardly extending arm 39 carries a lug 40 to form a seat for a pin 41 in the lever 24.

The lug 40 is offset with respect to the vertical plane of the rod 38 and a surface 42 on the arm 39 bears against the end of the pin 41 to limit rotary movement of the latch 37 in the direction of the lever 24. A coil spring 43 is arranged on the rod 38 to maintain the latch 37 in substantially the correct operative position. One end of the spring may be affixed to the latch 37 and the other end to a collar 44 affixed to the rod 38.

Means are provided for tripping the latch 37 to move it out of engagement with the lever 24. The means illustrated for this purpose consists of a rod or plate 45 which is vertically slidable in a slot 46 of a guide member 47 supported by the casing 23. The plate 45 carries a mass 48 of metal which is of sufficient weight to trip the latch 37 to its releasing position. In the side of the mass 48 is a bar 49 which, when the plate 45 descends in the slot 46, strikes an arm 50 of the latch member 37 and rocks the latch out of engagement with the pin 41 of the lever 24.

The plate 45 is normally supported by a plunger 51 which extends slidably through an aperture 52 in the guide member 47 and into an aperture 53 in the plate 45. The plunger is pivotally connected to the free end of an arm 54 of a bell crank 55 mounted on a pivot pin 56 on the guide member 47. The other arm 57 of the bell crank 55 is connected to a spring 58 which constantly tends to rock the bell crank 55 in a direction for withdrawing the plunger 51 from the aperture 53. The tension of the spring 58 may be conveniently adjusted by means of a screw 59 serving as an anchor for an end of the spring.

By means of the screw 59 the spring 58 may be tensioned to enable it to withdraw the plunger 51 from the aperture 53 for releasing the weight 45. Normally, however, the spring is rendered non-effective by the pressure in the lubricating system of the engine. The means employed for this purpose comprises a casing 60 consisting of a pair of plates 61 and 62 between which is clamped a diaphragm 63 to form a resilient wall for a pressure chamber 64 in the plate 62. The chamber 64 is connected with the source of lubricant supply under pressure by a conduit 65 having a branch conduit 66 connecting it to the discharge pipe 67 of the pump 22. The passage in the conduit 66 is preferably of considerably smaller diameter than that in conduit 67 so that no serious reduction in pressure will occur in the lubricating system in the event that the chamber 64 is vented to permit operation of the devices controlling the valve 25.

On the central portion of the diaphragm 63 is a plate 68 which bears against the end of a pin 69 slidable in the plate 61. The other end of the pin abuts an intermediate portion of the arm 54 of the bell crank 55 and the pin 69 thus serves to transmit the thrust of the diaphragm 63 to the plunger 51 for maintaining it in engagement with the plate 45.

To the end that the plate 45 may be maintained suspended above and in non-contacting relationship with the latch 37 during the starting of the engine, and during which time the pressure in the lubricating system is of insufficient value to maintain the plunger 51 in engagement with the plate 45, a manually actuated plunger or button 70 is arranged in the guide member 47 and coaxially with the plunger 51.

The button 70 comprises a head 71 adapted to extend into an enlarged portion 72 of the aperture 53 and a stem 73 which projects to the exterior of the guide member 47 and in convenient position to be actuated into the aperture 53 by the attendant.

In order that the safety device may be caused to operate for stopping the engine in the event that the engine speed exceeds a predetermined maximum said device is provided with means for relieving or removing the pressure in the chamber 64. The means provided for this purpose consists of a pressure relief device 74 interposed in a conduit 75 connected to the conduit 65.

The relief device comprises a casing 76 which may be supported by the pump 22 and has a bore 77 to accommodate a valve 78 of the plunger type. The valve has an annular external groove 79 to afford communication between the conduit 75 and a conduit 80 which may lead to the lubricant supply reservoir.

The ends of the valve 78 project exteriorly of the casing 76 and to one end is affixed, as by means of a screw 81, a seat 82 for a compression spring 83 of which an end seats against the outer surface of the casing 76. The valve 78 is further provided with a notch 84 for engagement with a spring-pressed detent 85 which serves to hold the valve 78 in position to maintain the groove 79 out of registry with the conduits 75 and 80. On the opposite end of the valve 78 is a head 86 of which the outer surface 87 is of convex shape.

The valve preferably lies in the horizontal plane of the shaft 88 of the pump 22 and the shaft 88 carries a flange 89 having a bore 90 to guide the stem 91 of a weight or plunger 92 which normally seats against the side of the flange 89. The outer surface 93 of the weight is convex and on the opposite end of the stem 91 is a seat 94 for an end of a spring 95 in a recess 96 in the flange 89 and acting to resist the centrifugal force acting upon the weight 93.

The operation of the device is as follows: Before setting the engine in operation the weighted plate 45 is lifted to a position in which the aperture 53 coincides with the head 71 of the button 70. The button 70 is then pressed into engagement with the plate to support it above the latch 37, it being understood, of course, that under these conditions the pressure of the lubricant in the chamber 64 will be of insufficient value to maintain the plunger 51 in engagement with the plate 45.

After the weighted plate 45 is mounted on the button 70 the lever 24 may be raised to open the valve 25 and the spring 43 will then rock the latch into position to place the lug 40 beneath the pin 41 for supporting the lever in that position. The valve 36 may then be opened to supply steam to the engine and as the speed of the engine increases and the pressure in the lubricating system, and acting against the diaphragm 63, approaches maximum the diaphragm will move the plunger 51 and push the button 70 out of engagement with the plate 45. The weight of the plate 45 will then be transferred to the plunger 51.

The plunger 51 stays in this position as long as the pressure in the lubricating system remains of the value required to assure thorough lubrication of the engine. However, should the pressure in the lubricating system drop below the force exerted by the spring 58 the spring will rock the bell crank 55 and withdraw the plunger 51 from the aperture 53 and release the plate 45. The plate 45 will then drop upon the latch 37 and rock it about the rod 38, thereby disengaging the lug from the pin 41. The lever 24 will then drop and move the valve 25 to the seat 27 to cut off the admission of steam to the engine, which will then come to rest.

In practice, the spring 58 is so adjusted that it will act to release the weighted plate 45 while the pressure in the lubricating system is still well within the range of safety so that the engine will be brought to rest while its bearing surfaces are still thoroughly lubricated. No harm will, therefore, be caused to any part requiring lubrication even though the pressure of the lubricant would be of insufficient value to warrant further prolonged operation of the engine.

During the normal operation of the engine, the valve 78 occupies a position in which the spring 83 is compressed and the groove 79 is out of registration with the conduits 75 and 80. The valve is held thus by the detent 85. Also, the weight 92 is then pressed against the side of the flange 89 by the spring 95. In the event, however, that the speed of the engine and, therefore, of the pump 22 exceeds a certain predetermined maximum the weight 92 is actuated centrifugally outwardly and, on striking the convex surface 87 of the button 86, releases the valve 78 from the detent 85. The spring 83 then shifts the valve 78 to a position in which the groove 79 registers with the conduits 75 and 80. In this way the pressure of the lubricant in the chamber 64 and in the conduits connecting said chamber with the relief device 74 is reduced to a value below that exerted by the spring 58 which will then disengage the plunger 51 from the plate 45 and the weighted plate will drop, in the manner previously described, to set the various elements in operation for closing the valve 25.

I claim:

1. In a safety device, the combination of an engine having a pressure lubricating system and a conduit for conveying power medium to the engine, of a valve to cut off the flow of power medium to the engine and having a lever, actuating means movable by gravity against the lever for closing the valve, a movable support for the actuating means, pressure responsive means subjected to the pressure of the lubricant for normally maintaining the movable support in engagement with the actuating means, means acting responsively to a decreasing pressure in the lubricating system to move the support out of supporting position to enable the actuating means to close the valve, and means acting in response to a predetermined maximum speed of the engine to cause operation of the last mentioned means.

2. In a safety device, the combination of an engine having a pressure lubricating system and a conduit for conveying power medium to the engine, of a valve to cut off the flow of power medium to the engine, a weighted lever on the valve, actuating means movable by gravity against the weighted lever for closing the valve, a movable support for the actuating means, pressure responsive means subjected to the pressure of the lubricant for normally maintaining the movable support in engagement with the actuating means, means acting responsively to a decreasing pressure in the lubricating system to move the support out of supporting position to enable the actuating means to close the valve, a relief valve for the pressure responsive means, and means acting in response to the speed of the engine for opening the relief valve.

3. The combination with an engine having a pressure lubricant system, of a valve to cut off the flow of power medium to the engine, a weighted lever to actuate the valve, a shiftable seat for the lever to normally hold the valve open, trip means for releasing the seat from the lever, a manually shiftable support for the trip means, a second support actuated by lubricant under pressure to displace the manually shiftable support for holding the trip means, and means for disengaging said second support from the trip means when the pressure in the lubricating system drops to a predetermined value, thereby enabling the trip means to disengage the seat from the weighted lever and the weighted lever to close the valve for cutting off the flow of power medium to the engine.

4. The combination with an engine having a pressure lubricant system, of a valve to cut off the flow of power medium to the engine, a weighted lever to actuate the valve, a shiftable seat for the lever to normally hold the valve open, trip means for releasing the seat from the lever, a button to support the trip means and being manually actuated into engagement with the trip means, a plunger actuated by lubricant under pressure to displace the button and to support the trip means, and a spring for disengaging the plunger from the trip means when the pressure in the lubricating system drops to a predetermined value, thereby enabling the trip means to disengage the seat from the weighted lever and the weighted lever to close the valve for cutting off the flow of power medium to the engine.

ALLAN O. CARPENTER.